Sept. 29, 1964

G. HANNAPPEL ETAL
PROCESS FOR SUBSTANTIALLY REDUCING
THE CONSUMPTION OF ARC ELECTRODES
Filed April 28, 1961

3,151,266

INVENTORS
Günther Hannappel
Erich Schallus

BY
Connolly and Hutz

THEIR ATTORNEYS

United States Patent Office 3,151,266
Patented Sept. 29, 1964

3,151,266
PROCESS FOR SUBSTANTIALLY REDUCING THE CONSUMPTION OF ARC ELECTRODES
Günther Hannappel, Frankfurt am Main, and Erich Schallus, Cologne, Germany, assignors to Knapsack-Griesheim Aktiengesellschaft, Knapsack, near Cologne, Germany, a corporation of Germany
Filed Apr. 28, 1961, Ser. No. 106,381
10 Claims. (Cl. 314—25)

The present invention relates to a process for substantially reducing the consumption of arc electrodes.

It is a characteristic feature of high power-loaded positive arc electrodes that the frontal area facing the electric arc is strongly heated due to the striking of electrons mainly originating from the arc plasma and additionally accelerated in the anode fall. Thus, above a definite current strength the electrode is notably evaporated so that the electrode is consumed in a relatively short period. In order to reduce this undesired consumption of metal electrodes at least to a large degree it is known to cool the electrodes with liquid or gaseous media. However, in spite of the cooling, the consumption of metal electrodes cannot be avoided completely owing to the thermal surface evaporation and partially also for chemical reasons.

With specifically the same load the consumption of carbon electrodes is considerably greater than that of cooled metal electrodes. This results from the impossibility to cool the carbon effectively and from the fact that carbon electrodes evaporate especially strongly on the frontal area under atmospheric conditions and approximately under a current load from 40 ampere/cm.$^2$ onward.

The aforesaid current density is, however, often much too small for the industrial application of the carbon-electric arc process, especially in chemical processes. In principle, it is possible further to increase the current density, but in this case the consumption of the carbon electrodes increases linearly to a greater extent than the current strength. This fact and the impossibility to use cooled metal electrodes for chemical reasons in a great number of chemical processes, for example, owing to the detrimental action of the metal electrode vapor, represent economic and technical disadvantages.

The great consumption of carbon electrodes is not only uneconomical in view of the high price of the carbon but also in view of the required labor for exchanging in relatively short periods of time the consumed electrodes for fresh ones so as to obtain a continuously burning electric arc.

Furthermore, in the known electric arc installations with carbon electrodes considerable operative disturbances occur when the electrodes which, in the interest of a continuous burning, are connected preferably by screwing and/or bonding, are mechanically blocked or break on being forwarded due to uneven joints. During the continuous operation uneven joints of carbon electrodes can only be worked with great technical expenditure, and in spite of this, absolute safety for the operators cannot be guaranteed since the electrodes are always under voltage, which may amount in installations of this kind to several thousand volts. It is quite obvious that already the fixing of electrodes under such high voltages by means of nipples is very dangerous.

The present invention provides a process for at least substantially reducing the aforesaid disadvantages of either metal or carbon electrodes in electric arc processes by introducing in the direct neighbourhood of the electrodes and/or in the space between several electrodes a definite amount of an organic compound, preferably a hydrocarbon compound and/or elementary carbon, decomposing the organic compound in the arc space and depositing the formed and/or the introduced elementary carbon in controllable manner on the electrodes as the carbon contacts the electrodes and adheres thereto.

By this process the electrode material which evaporates and/or is chemically decomposed during the burning of the arc is complemented in controllable manner by the carbon introduced into the arc space, which carbon deposits by way of chemical transformation and/or physical deposition on the electrodes.

The introduction of carbon into the electric arc is already known. But hitherto efforts were made not to allow the carbon to deposit on the electrodes. It has now been found that by a controllable deposition of carbon on the electrodes the consumption thereof can be reduced to at least a substantial degree.

For obtaining a rotation-symmetrical form of the deposition on the electrodes the latter are rotated. The deposition has preferably a cylindrical form but other rotation-symmetrical forms are likewise suitable. For compensating uneven or too small carbon deposits, the electrodes can additionally be moved in longitudinal direction.

Suitable electrodes on which carbon is deposited by the process of the invention are carbon electrodes or cooled metal electrodes.

The organic compound and/or the elementary carbon is introduced through the electrodes which are provided with a concentrical and/or an eccentrical canal in the interior or with a groove which preferably runs in the direction of the longitudinal axis of the electrode in the surface of the electrode. The organic compound and/or the elementary carbon can likewise be supplied through an annular space concentrically or eccentrically surrounding the electrode.

When the organic compound and/or the elementary carbon is supplied eccentrically, the cabon deposits in the form of a shoe on the frontal area of the electrode. Thus the frontal area is enlarged whereby the current load per sq. cm. of electrode surface is considerably reduced, while the distance to the neighbouring electrode parts remains practically unchanged.

Alternatively, it is suitable to supply the organic compound and/or the elementary carbon in the form of at least one jet directed on the electrodes in a manner such that the discharge zone is completely enveloped spatially.

The deposition of the carbon is controlled by known arrangements and manual means, in automatic dependency on the electric arc voltage or power, or by electro-optical scanning devices. The latter controlling means permit, when arranged in suitable manner, a control of the electrode diameter and of the electrode position. Furthermore, the current of the electric arc can be regulated in a manner such that the average electrode consumption remains unchanged. Moreover, the amount and/or the spatial distribution of the organic compound and/or the elementary carbon striking on the electrode and serving for building up the electrode is regulated so that the medium electrode distance remains unchanged.

The accompanying drawing diagrammatically illustrates by way of example a mode of execution of the invention.

Since, on the one hand, the arc voltage increases with the growing arc length and, on the other hand, the amount of carbon depositing on the electrodes becomes greater with the increasing amount of hydrocarbon supplied, a regulation can be readily carried out by known means.

Figure 1:
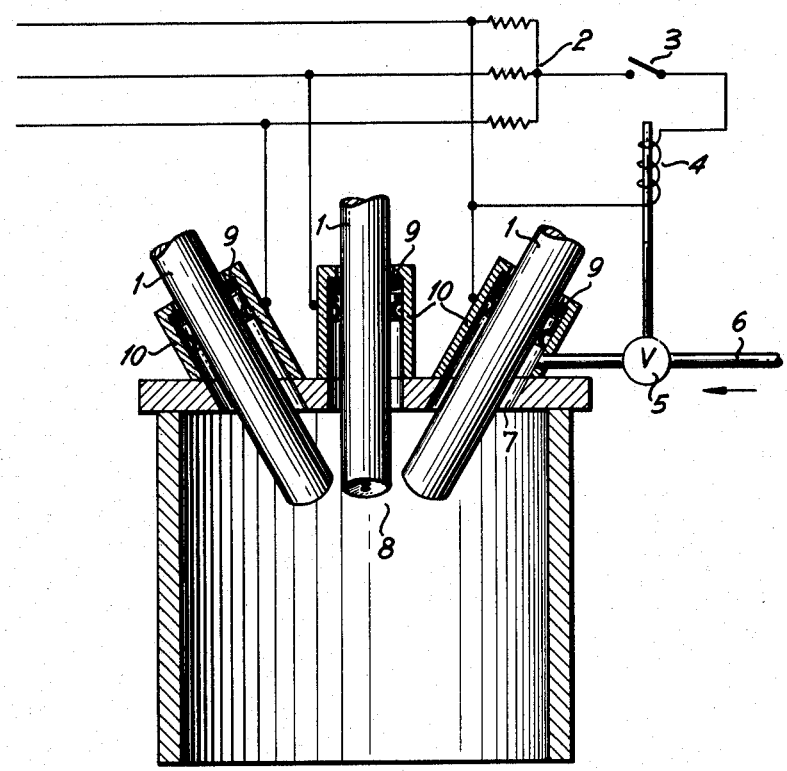
FIGURE 1 represents an arc furnace for three phase current, in which the amount of organic compound supplied, in the present case hydrocarbon, is automatically regulated in dependency on the electrode consumption via the arc voltage.
Figure 2:
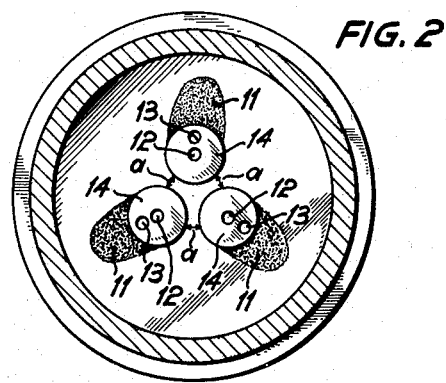
FIGURE 2 is a view from below of a shoe-like deposition of carbon on the electrodes of a three phase current furnace.

FIGURE 1 shows that the voltage between the electrode 1 and the artificially formed star point 2, which voltage is proportional to the arc voltage, is conducted via a voltage dependent switch 3 to the coil 4 of a magnet valve 5 which opens when the coil 4 is excited and thus allows hydrocarbon above a limit voltage to flow through conduit 6 in the direction of the arrow and through annular space 7 along the electrode 1 on which carbon shall deposit into the arc zone 8. The numeral 9 designates a packing ring which prevents the gas from escaping from the current supply sleeve 10. By adjusting the striking voltage of the switch 3 and by the gas streaming from the annular space 7 in definite direction the loss of material occurring on the electrode 1 is compensated by the newly depositing carbon. FIGURE 2 shows that the shoe-like deposition 11, that is to say a one-side deposition, takes place in a manner such that the original electrode distance $a$ remains practically unchanged. The organic compound and/or the elementary carbon is supplied through borings 12, 13 which are arranged centrically or eccentrically in electrodes 14. In the present case the electrodes 14 are stationary. For controlling the distance $a$ optic devices are installed in the furnace, preferably in the center above electrodes 14 which are connected with regulating means for the amount and direction of the arriving organic compound.

It is likewise possible to supply hydrocarbon continuously and only to regulate quantitatively a part of it.

The process of the invention can be carried out in most different ways and it is not limited to the example illustrated diagrammatically in the accompanying drawings. The individual parts can be constructed and arranged in any desired manner depending on the requirements in each case.

We claim:

1. In the process for substantially reducing the consumption of arc electrodes by introducing in the immediate vicinity of the electrodes a substance selected from the group consisting of an organic compound and elementary carbon, the substance decomposing in the arc space, and building up a deposit of carbon on the electrodes as said substance comes into contact with said electrodes and adheres thereto, the improvement consisting of introducing said substance in excess of that which will produce a reducing atmosphere and in sufficient quantity to produce a material electrode coating.

2. The method of claim 1 wherein the introduction of said substance is initiated when the arc voltage reaches a predetermined limit.

3. The process of claim 1 wherein said substance is supplied through an annular space concentrically surrounding the electrode.

4. The process of claim 1 wherein said substance is supplied through an annular space eccentrically surrounding the electrode.

5. The process of claim 1 wherein said substance is directed in the form of several jets on the electrodes.

6. The process of claim 1 wherein the organic compound is a hydrocarbon compound.

7. The process of claim 1 wherein for producing a rotation-symmetrical deposition on the electrode the latter is rotated during the deposition of carbon.

8. The process of claim 7 wherein the carbon is deposited in cylindrical form.

9. The process of claim 1 wherein the electrode is a carbon electrode.

10. The process of claim 1 wherein the electrode is a cooled metal electrode.

References Cited in the file of this patent
UNITED STATES PATENTS
3,010,796   Alexander et al. _____ Nov. 28, 1961